(12) United States Patent
Morris

(10) Patent No.: US 10,577,507 B2
(45) Date of Patent: Mar. 3, 2020

(54) ALKALINE CLEANING COMPOSITIONS FOR METAL SUBSTRATES

(71) Applicant: PRC-DeSoto International, Inc., Sylmar, CA (US)

(72) Inventor: Eric L. Morris, Murrieta, CA (US)

(73) Assignee: PRC-DeSoto International, Inc., Sylmer, CA (US)

( * ) Notice: Subject to any disclaimer, the term of this patent is extended or adjusted under 35 U.S.C. 154(b) by 314 days.

(21) Appl. No.: 14/775,129

(22) PCT Filed: Mar. 13, 2014

(86) PCT No.: PCT/US2014/026108
§ 371 (c)(1),
(2) Date: Sep. 11, 2015

(87) PCT Pub. No.: WO2014/151617
PCT Pub. Date: Sep. 25, 2014

(65) Prior Publication Data
US 2016/0032112 A1 Feb. 4, 2016

Related U.S. Application Data

(60) Provisional application No. 61/802,619, filed on Mar. 16, 2013.

(51) Int. Cl.
| | | |
|---|---|---|
| *C11D 3/00* | (2006.01) | |
| *C09D 5/08* | (2006.01) | |
| *C23G 1/22* | (2006.01) | |
| *C23G 1/16* | (2006.01) | |
| *C23G 1/18* | (2006.01) | |
| *C11D 3/386* | (2006.01) | |
| *C23C 22/78* | (2006.01) | |
| *C23C 22/34* | (2006.01) | |
| *B05D 3/00* | (2006.01) | |
| *B05D 7/14* | (2006.01) | |
| *B05D 7/00* | (2006.01) | |
| *C09D 139/06* | (2006.01) | |

(52) U.S. Cl.
CPC ............ *C09D 5/084* (2013.01); *B05D 3/002* (2013.01); *B05D 7/14* (2013.01); *B05D 7/52* (2013.01); *C09D 5/086* (2013.01); *C09D 139/06* (2013.01); *C11D 3/38681* (2013.01); *C23C 22/34* (2013.01); *C23C 22/78* (2013.01); *C23G 1/16* (2013.01); *C23G 1/18* (2013.01); *C23G 1/22* (2013.01); *C23C 2222/10* (2013.01)

(58) Field of Classification Search
None
See application file for complete search history.

(56) References Cited

U.S. PATENT DOCUMENTS

| | | | |
|---|---|---|---|
| 2,155,045 A | 4/1939 | Griffith et al. | |
| 2,303,398 A | 12/1942 | Schwartz | |
| 4,098,720 A | 7/1978 | Hwa | |
| 4,762,638 A | 8/1988 | Dollman et al. | |
| 4,963,290 A | 10/1990 | Bressan et al. | |
| 5,712,236 A * | 1/1998 | Bolkan | C11D 1/002 510/255 |
| 5,747,439 A * | 5/1998 | Dunn | C11D 3/0073 510/255 |
| 5,772,919 A | 6/1998 | Reichgott et al. | |
| 7,220,297 B2 | 5/2007 | Pipko et al. | |
| 7,547,671 B2 | 6/2009 | Kaneko et al. | |
| 2015/0152365 A1* | 6/2015 | Yang | C11D 7/261 134/22.13 |

FOREIGN PATENT DOCUMENTS

| | | |
|---|---|---|
| DE | 32 17 145 A1 | 11/1983 |
| EP | 1 666 634 A1 | 6/2006 |
| EP | 1 690 961 A1 | 8/2006 |
| EP | 2 570 515 A2 | 3/2013 |
| GB | 1062173 A | 3/1967 |
| JP | S5318432 A | 2/1978 |
| JP | 2003221598 A | 8/2003 |
| JP | 2004123830 | 4/2004 |
| JP | 2004155923 | 6/2004 |
| JP | 2005097726 A | 4/2005 |
| JP | 2006169595 | 6/2006 |

OTHER PUBLICATIONS

Espacenet English abstract of DE 32 17 145 A1.
English translation of the Abstract of JP2006169595.
English translation of the Abstract of JP2004155923.
English translation of the Abstract of JP2004123830.

* cited by examiner

*Primary Examiner* — Necholus Ogden, Jr.
(74) *Attorney, Agent, or Firm* — Alicia M. Passerin

(57) ABSTRACT

A composition for application to a metal substrate comprises an aqueous carrier, a hydroxide anion and/or a phosphate anion, and a corrosion inhibitor comprising an azole compound, a rare earth ion, an alkali earth metal ion, and/or a transition metal ion. A substrate or article includes the composition for application to a metal substrate and a coating on the composition. A method of fabricating a substrate comprises applying the composition to a substrate, allowing the composition to dry to form a dried composition, and applying a coating on the dried composition.

14 Claims, No Drawings

ALKALINE CLEANING COMPOSITIONS FOR METAL SUBSTRATES

CROSS-REFERENCE TO RELATED APPLICATION(S)

This application claims priority to and the benefit of U.S. Provisional Application Ser. No. 61/802,619, filed on Mar. 16, 2013 in the U.S. Patent and Trademark Office, the entire content of which is incorporated herein by reference.

BACKGROUND

Metals such as aluminum and their alloys have many uses in aerospace, commercial, and private industries. However, these metals have a propensity to corrode rapidly in the presence of water due to their low oxidation-reduction (redox) potential, thus significantly limiting the useful life of objects made from these metals, and/or increasing maintenance costs. These metals also may have a problem with paint adhesion, as the surface of the metal, when formed into an object, is generally very smooth.

The oxidation and degradation of metals used in aerospace, commercial, and private industries are serious and costly problems. To prevent the oxidation and degradation of the metals used in these applications; a protective coating can be applied to the metal surface. This protective coating may be the only coating applied to the metal, or other coatings can be applied to further protect the metal surface. In order to provide proper adhesion of coatings to the substrate surface and to provide corrosion resistance to the metal substrate, the substrate can be cleaned prior to application of the coatings. Typical cleaners may include alkaline based cleaners, which remove greases, oils, waxes and dirt from the metal surface. Acid cleaning/etching may also or alternatively be performed to remove metal oxides (e.g., rust, smut, etc.) and make the metal surface chemically active for the next finishing step.

Conventional cleaners can often produce smut when the substrate is cleaned, provide poor or inadequate adhesion of subsequent coatings, require the use of multiple steps and extensive periods of time to clean the substrate, require commercially unattractive steps, such as additional rinsing, deoxidizing, and/or sealing steps, and/or require the use of elevated temperature solutions. Multiple step cleaning processes add to the cost of metal finishing and increase environmental pollution. Therefore, an alkaline metal cleaner which does not produce smut, is effective in increasing adhesion of subsequent coatings in the metal finishing process, does not require multiple steps for application, and/or can be applied at room temperature would be desirable.

SUMMARY

According to embodiments of the present invention, a composition for application to a metal substrate comprises an aqueous carrier, a hydroxide anion and/or a phosphate anion, and a corrosion inhibitor comprising an azole compound, a rare earth ion, an alkali earth metal ion, and/or a transition metal ion.

DESCRIPTION

According to embodiments of the present invention, a cleaning composition for a metal substrate comprises an alkaline metasilicate formulation. In some embodiments, the composition comprises a hydroxide and/or a phosphate, and a corrosion inhibitor, such as, for example a zinc salt and/or an azole compound.

As used herein, the following terms have the following meanings.

The term "substrate," as used here, refers to a material having a surface. In reference to applying a conversion coating, the term "substrate" refers to a metal substrate such as aluminum, iron, copper, zinc, nickel, magnesium, and/or an alloy of any of these metals including but not limited to steel. Some exemplary substrates include aluminum and aluminum alloys. Additional exemplary substrates include high copper aluminum substrates (i.e., substrates including an alloy containing both aluminum and copper in which the amount of copper in the alloy is high, for example, an amount of copper in the alloy of 3 to 4%).

The term "coating," and like terms, when used as a verb herein, refers to the process of applying a composition, i.e., contacting a substrate with a composition, such as contacting a substrate with a conversion coating, primer, and/or topcoat. The term "coating" may be used interchangeably with the terms "application/applying," "treatment/treating" or "pretreatment/pretreating", and may also be used to indicate various forms of application or treatment, such as painting, spraying and dipping, where a substrate is contacted with a composition by such application means. All or part of the substrate can be contacted. That is, the compositions of the present invention can be applied to at least a portion of a substrate.

The term "conversion coating," also referred to herein as a "conversion treatment" or "pretreatment" refers to a treatment for a metal substrate that causes the chemistry of the metal surface to be converted to a different surface chemistry. The terms "conversion treatment" and "conversion coating" also refer to the application or treatment of a metal surface in which a metal substrate is contacted with an aqueous solution having a metal of a different element than the metal contained in the substrate. Additionally, the terms "conversion coating" and "conversion treatment" refer to an aqueous solution having a metal element in contact with a metal substrate of a different element, in which the surface of the substrate partially dissolves in the aqueous solution, leading to the precipitation of a coating on the metal substrate (optionally using an external driving force to deposit the coating on the metal substrate).

The term "metallate," as used herein, refers to a complex anion containing a metal ligated to several atoms or small groups.

The term "metasilicate," as used herein, refers to a salt of metasilicic acid $H_2SiO_3$, such as, for example, sodium, calcium, and/or barium metasilicate.

The term "rare earth element," as used herein, refers to an element in Group IIIB (or the lanthanide series) of the periodic table of the elements or yttrium. The group of elements known as the rare earth elements includes, for example, elements 57-71 (i.e., La, Ce, Pr, Nd, Pm, Sm, Eu, Gd, Tb, Dy, Ho, Er, Tm, Yb and Lu) and yttrium. In some embodiments, however, as noted below, the term rare earth element may refer to La, Ce, Pr, Nd, Sm, Eu, Gd, Tb, Dy, Ho, Er, Tm, Yb, Lu and Y.

The term "Group IA metal ion," or "Group 1 metal ion" as used herein, refers to an ion or ions of elements from the first column of the periodic table (with the exception of H). The group of elements identified by Group IA or Group 1 (with the exception of H) is also known as the alkali metals, and includes, for example, Li, Na, K, Rb, Cs, and Fr.

The term "Group IIA metal ion," or "Group 2 metal ion" as used herein, refers to an ion or ions of elements from the second column of the periodic table. The group of elements identified by Group IIA or Group 2 is also known as the alkali earth metals, and includes, for example, Be, Mg, Ca, Sr, Ba and Ra.

The term "transition metallate," as used herein, refers to a metallate compound comprising a transition metal. The group of elements known as transition metals include Sc, Ti, Zr, Hf, Rf, V, Nb, Ta, Db, Cr, Mo, W, Sg, Mn, Tc, Re, Bh, Fe, Ru, Os, Hs, Co, Rh, Ir, Mt, Ni, Pd, Pt, Ds, Cu, Ag, Au, Rg, Zn, Cd, Hg and Cn.

The term "salt," as used herein, refers to an ionically bonded inorganic compound and/or the ionized anion and cation of one or more inorganic compounds in solution.

As used in this disclosure, the term "comprise" and variations of the term, such as "comprising" and "comprises," are not intended to exclude other additives, components, integers ingredients or steps.

All amounts disclosed herein are given in weight percent of the total weight of the composition at 25° C. and one atmosphere pressure, unless otherwise indicated.

According to embodiments of the invention, a composition for application to a metal substrate may be alkaline and comprise a hydroxide, a phosphate and/or a metasilicate, and a corrosion inhibitor comprising a metal cation (such as, for example, a zinc cation) and/or an azole compound. The composition may be aqueous, i.e., the composition may further comprise an aqueous carrier, for example, water. The aqueous carrier may optionally comprise one or more organic solvents. Nonlimiting examples of suitable such solvents include propylene glycol, ethylene glycol, glycerol, low molecular weight alcohols, and the like. When used, the organic solvent may be present in the composition in an amount of 30 g solvent per 12 liters of composition to 400 g solvent per 12 liters of composition, with the remainder of the carrier being water. For example, in some embodiments, the organic solvent may be present in the composition in an amount of 100 g solvent per 12 liters of composition to 200 g solvent per 12 liters of composition, for example 107 g solvent per 12 liters of composition, with the remainder of the carrier being water. In some embodiments, however, the aqueous carrier is primarily water, e.g., deionized water. The aqueous carrier is provided in an amount sufficient to provide the composition with the concentrations of the metal ions and azole compounds described above.

In some embodiments, the hydroxide ion may be present in the composition in an amount of 0.05 to 25 g/1000 g solution, for example 18 to 20 g/1000 g solution. In compositions having a phosphate, the phosphate may comprise phosphate $(PO_4)^{3-}$, di-hydrogen phosphate $(H_2PO^4)^-$, and/or pyrophosphate $(P_2O_7)^{4-}$, for example, phosphate $(PO_4)^{3-}$ and/or pyrophosphate $(P_2O_7)^{4-}$. The phosphate may be present in the composition in an amount of 50 g/1000 g solution to 10 g/1000 g solution, for example 70 g/1000 g solution to 90 g/1000 g solution. Other nonlimiting examples of suitable phosphates include organo phosphates, such as Dequest™ obtainable from Monsanto (St. Louis, Mo.).

The metal cation in the corrosion inhibitor (when included) may comprise various metal cations which have corrosion inhibiting characteristics. For example, in some embodiments, the metal cation may comprise a rare earth element, such as, for example, La, Ce, Pr, Nd, Pm, Sm, Eu, Gd, Tb, Dy, Ho, Er, Tm, Yb, Lu. In some embodiments, the rare earth element comprises La, Ce, Pr, Nd, Sm, Eu, Gd, Tb, Dy, Ho, Er, Tm, Yb, Lu and/or Y. For example, in some embodiments, the rare earth element comprises Ce, Y, Pr and/or Nd, and in some embodiments, the rare earth element comprises Ce, Pr and/or Nd. Other suitable metal cations include Group IA or Group IIA metal cations (i.e., the alkali metals and alkali earth metals) or transition metal cations (e.g., Zn). In some embodiments, for example, the metal cation may comprise a rare earth ion, an alkali earth metal ion, a transition metal ion, a Li ion, a K, ion, a Rb ion, a Cs ion and/or a Fr ion. In some embodiments, for example, the metal cation may comprise Ce, Y, Pr, Nd, Zr, Zn, Li, K and/or Mg. In some embodiments, the metal ion may be Cr, however, in other embodiments, the composition may be substantially chrome-free. As used herein, the term "substantially" is used as a term of approximation and not as a term of degree. Additionally, the term "substantially chrome-free" is used as a term of approximation to denote that the amount of chrome in the composition is negligible, such that if chrome is present in the composition at all, it is as an incidental impurity.

The metal cation can be present in the composition at a concentration of 0.01 g per liter of composition to 25 g per liter of composition, for example, 0.05 g per liter of composition to 25 g per liter of composition. For example, in some embodiments, the metal cation can be present in the composition at a concentration of 0.05 g per liter of composition to 16 g per liter of composition. In some embodiments, for example, the metal cation can be present in the composition at a concentration of 0.1 g per liter of composition to 10 g per liter of composition. For example, in some embodiments, the metal cation can be present in the composition at a concentration of 1 g per liter of composition to 5 g per liter of composition. The upper limit of the amount of the metal ion may depend on the solubility of the salt used as a source for the metal ion. For example, when the metal cation includes a rare earth cation or a transition metal cation, the rare earth cation or transition metal cation may be present at a concentration of 0.01 g per liter of composition to 25 g per liter of composition, or 0.05 g per liter of composition to 10 g per liter of composition. For example, when the metal cation comprises a Zn cation, the Zn cation may be present in the composition in an amount of 0.08 g/L. When the metal cation includes an alkali metal or alkali earth metal cation, the alkali metal or alkali earth metal cation may be present at a concentration of 0.05 g per liter of composition to 16 g per liter of composition, or 1 g per liter of composition to 5 g per liter of composition. As discussed in further detail below, the metal cation may be provided in the composition in the form of a metal salt, in which case, the amounts listed here reflect the amount of the salt in the composition.

As noted above, the metal cation may be provided in the composition in the form of a salt (i.e., a metal salt may serve as the source for the metal cation in the composition) having an anion and the metal cation as the cation of the salt. The anion of the salt may be any suitable anion capable of forming a salt with the rare earth elements, alkali metals, alkali earth metals, and/or transition metals. Nonlimiting examples of anions suitable for forming a salt with alkali metals, alkali earth metals, transition metals and rare earth elements include carbonates, hydroxides, nitrates, halides (e.g., Cl$^-$, Br$^-$, I$^-$ or F$^-$), sulfates, phosphates and silicates (e.g., orthosilicates and metasilicates). However, the compositions according to embodiments of the present invention comprise at least one hydroxide and/or phosphate. For example, the metal salt may comprise a carbonate, hydroxide, halide, nitrate, sulfate, phosphate and/or silicate (e.g., orthosilicate or metasilicate) of Li, Na, K, Rb, Cs, Fr, Be, Mg, Ca, Sr, Ba, Ra, Y, La, Ce, Pr, Nd, Pm, Sm, Eu, Gd, Tb, Dy, Ho, Er, Tm, Yb, Lu, Sc, Ti, Zr, Hf, Rf, V, Nb, Ta, Db, Cr, Mo, W, Sg, Mn, Tc, Re, Bh, Fe, Ru, Os, Hs, Co, Rh, Ir, Mt, Ni, Pd, Pt, Ds, Cu, Ag, Au, Rg, Zn, Cd, Hg and/or Cn. In some embodiments for example, the metal salt may comprise a carbonate, hydroxide, halide, nitrate, sulfate, phosphate and/or silicate (e.g., orthosilicate or metasilicate) of Li, Na, K, Rb, Cs, Be, Mg, Ca, Sr, Ba, Y, La, Ce, Pr, Nd, Sm, Eu, Gd, Tb, Dy, Ho, Er, Tm, Yb, Lu, Sc, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and/or Hg. In some embodiments, for example, the metal salt may comprise a carbonate, hydroxide, halide, nitrate, sulfate, phosphate and/or silicate (e.g., orthosilicate or metasilicate) of Li, Na, K, Rb, Cs, Be, Mg, Ca, Sr, Ba, Y, La, Ce, Pr, Nd, Sm, Eu, Gd, Tb, Dy, Ho, Er, Tm, Yb, Lu, Sc, Ti, Zr, Hf, V, Nb, Ta, Mo, W, Mn, Tc, Re, Ru, Os, Co, Rh, Ir, Pd, Pt, Ag, Au, Zn, Cd and/or Hg. In some embodiments, for example, the metal salt may comprise a carbonate, hydroxide, halide, nitrate, sulfate, phosphate and/or silicate (e.g., orthosilicate or metasilicate) of a rare earth ion, an alkali earth metal ion, a transition metal ion, a Li ion, a K ion, a Rb ion, a Cs ion and/or a Fr ion. For example, in some embodiments, the metal salt may comprise a carbonate, hydroxide, halide, nitrate, sulfate, phosphate and/or silicate (e.g., orthosilicate or metasilicate) of Ce, Y, Pr, Nd, Zr, Zn, Li, Na, K and/or Mg. In some embodiments, for example, the metal salt may comprise a carbonate, hydroxide, halide, nitrate, sulfate, phosphate and/or silicate (e.g., orthosilicate or metasilicate) of Ce, Y, Pr, Nd, Zr, Zn, Li, K and/or Mg.

In some embodiments, for example, the metal cation comprises zinc, and is provided as a salt. The zinc salt may comprise zinc phosphate, zinc fluoride, and/or the like. In some embodiments, the zinc cation is present (and when provided as a salt, the salt is present) in the composition in an amount of 0.1 g/1000 g solution to 12 g/1000 g solution.

Additionally, in some embodiments, the composition may include at least two metal salts, and the at least two metal salts may comprise different anions and/or cations from each other. For example, the at least two metal salts may comprise different anions but the same cations, or may comprise different cations but the same anions.

According to embodiments of the present invention, the salt comprises a metasilicate anion and the metal cation described above. For example, the metasilicate may comprise an alkali metal or alkali earth metal salt of metasilicic acid. In some embodiments, for example, the metasilicate may comprise a metasilicate of Li, Na, K, Rb, Cs, Fr, Be, Mg, Ca, Sr, Ba and/or Ra. For example, in some embodiments, the metasilicate may comprise a metasilicate of Li, Na, K, Rb, Cs, Be, Mg, Ca, Sr and/or Ba. In some exemplary embodiments, the metasilicate comprises a metasilicate of Na, Ca and/or Ba. According to embodiments of the present invention, compositions including the metasilicate have an alkaline pH.

The azole compound may include cyclic compounds having 1 nitrogen atom, such as pyrroles, 2 or more nitrogen atoms, such as pyrazoles, imidazoles, triazoles, tetrazoles and pentazoles, 1 nitrogen atom and 1 oxygen atom, such as oxazoles and isoxazoles, and 1 nitrogen atom and 1 sulfur atom, such as thiazoles and isothiazoles. Nonlimiting examples of suitable azole compounds include 2,5-dimercapto-1,3,4-thiadiazole (CAS: 1072-71-5), 1H-benzotriazole (CAS: 95-14-7), 1H-1,2,3-triazole (CAS: 288-36-8), 2-amino-5-mercapto-1,3,4-thiadiazole (CAS: 2349-67-9), also named 5-amino-1,3,4-thiadiazole-2-thiol, and 2-amino-1,3,4-thiadiazole (CAS: 4005-51-0). In some embodiments, for example, the azole comprises 2,5-dimercapto-1,3,4-thiadiazole. The azole compound is present in the composition in an effective corrosion inhibiting amount, for example, 0.5 g/L of composition to 15 g/L of composition. In some embodiment, for example, the azole compound may be present in the composition in an amount of 0.7 g/L of composition. For example, 2,5-dimercapto-1,3,4-thiadiazole may be present in the composition in an amount of 1 g/L of composition to 12 g/L of composition, and in some embodiments 10 g/L of composition to 15 g/L of composition, or 12 g/L of composition. In some embodiments, 1H-benzotriazole may be present in an amount of 0.5 g/L of composition to 5 g/L of composition, for example 1 g/L of composition.

The composition may further include a halide ion. Suitable halide ions include chloride ions, fluoride ions, iodide ions and bromide ions. For example, in some embodiments, the halide ion comprises a fluoride ion. The halide ion may be provided in the composition the form of a salt with the metal cations described above. For example, in some embodiments, a fluoride ion is provided from a ZnF salt. In some embodiments, the halide ion may be present in the composition (and when the halide ion is provided as a salt, the salt may be present in the composition) in an amount of 0.2 g/1000 g solution to 1.5 g/1000 g solution.

In some embodiments, the composition may contain other components and/or additives such as, but not limited to, carbonates, surfactants, chelators, thickeners, allantoin, polyvinylpyrrolidone, 2,5-dimercapto-1,3,4-thiadiazole, halides, adhesion promotors, such as adhesion promoting silanes (e.g., silanes having an amine and/or hydroxyl functionality; or a zirconium alkoxide and/or a silane coupling agent) and alcohols. In some embodiments, the additive includes a surfactant, which may be present in the solution in an amount of 0.015 g/1000 g solution to 60 g/1000 g solution. Surfactants suitable for use in embodiments of the present invention include Dynol 604 and Carbowet® DC01 Surfactant (both commercially available from Air Products, having offices in Allentown, Pa.), and Triton X-100 (available from The Dow Chemical Company, Midland Mich.).

In some embodiments, polyvinylpyrrolidone is used as an additive, and may be present in the composition in an amount of 0.01 g/1000 g solution to 5 g/1000 g solution, for example 0.02 g/1000 g solution to about 1 g/1000 g.

According to some embodiments of the present invention, the composition may comprise potassium hydroxide, potassium phosphate, potassium pyrophosphate, polyvinyl pyrrolidone, allantoin, zinc phosphate, and a surfactant (e.g., Carbowet® DC01 Surfactant from Air Products). The potassium hydroxide may be present in the composition in an amount of 19.4 g/12,000 composition, the potassium phosphate may be present in an amount of 57.6 g/12,000 g composition, the potassium pyrophosphate may be present in an amount of 27.6 g/12,000 g composition, the polyvinyl pyrrolidone may be present in an amount of 0.23 g/12,000 g composition, the allantoin may be present in an amount of 0.33 g/12,000 g composition, the zinc phosphate may be present in an amount of 0.8 g/12,000 g composition, and the surfactant may be present in an amount of 49 g/12,000 g composition. The composition may further include water in an amount sufficient to yield 12,000 g of the total composition and/or to provide a composition having the concentrations of potassium hydroxide, potassium phosphate, potassium pyrophosphate, polyvinyl pyrrolidone, allantoin, zinc phosphate, and a surfactant described here.

According to some embodiments of the present invention, the composition may comprise sodium hydroxide, sodium phosphate, zinc phosphate, polyvinyl pyrrolidone, allantoin, and a surfactant (e.g., Carbowet® DC01 Surfactant from Air Products). The sodium hydroxide may be present in the composition in an amount of 19 g/12,000 composition, the sodium phosphate may be present in an amount of 75/12,000 g composition, the zinc phosphate may be present in an amount of 1 g/12,000 g composition, the polyvinyl pyrrolidone may be present in an amount of 0.23 g/12,000 g composition, the allantoin may be present in an amount of 0.33 g/12,000 g composition, and the surfactant may be present in an amount of 49 g/12,000 g composition. The composition may further include water in an amount sufficient to yield 12,000 g of the total composition and/or to provide a composition having the concentrations of sodium hydroxide, sodium phosphate, zinc phosphate, polyvinyl pyrrolidone, allantoin, and a surfactant described here.

According to some embodiments of the present invention, the composition may comprise sodium hydroxide, sodium phosphate, polyvinyl pyrrolidone, allantoin, DMTZ (2,5-dimercapto-1,3,4-thiadiazole), and a surfactant (e.g., Carbowet® DC01 Surfactant from Air Products). The sodium hydroxide may be present in the composition in an amount of 19 g/12,000 composition, the sodium phosphate may be present in an amount of 75 g/12,000 g composition, the polyvinyl pyrrolidone may be present in an amount of 0.23 g/12,000 g composition, the allantoin may be present in an amount of 0.33 g/12,000 g composition, the DMTZ may be present in an amount of 12 g/12,000 g composition, and the surfactant may be present in an amount of 49 g/12,000 g composition. The composition may further include water in an amount sufficient to yield 12,000 g of the total composition and/or to provide a composition having the concentrations of sodium hydroxide, sodium phosphate, polyvinyl pyrrolidone, allantoin, DMTZ, and surfactant described here.

According to some embodiments of the present invention, the composition may comprise potassium hydroxide, potassium phosphate, potassium pyrophosphate, polyvinyl pyrrolidone, allantoin, catechol violet (CV), ZnF, and a surfactant (e.g., Carbowet® DC01 Surfactant from Air Products). The potassium hydroxide may be present in the composition in an amount of 19.4 g/12,000 composition, the potassium phosphate may be present in an amount of 57.6 g/12,000 g composition, the potassium pyrophosphate may be present in an amount of 27.6 g/12,000 g composition, the polyvinyl pyrrolidone may be present in an amount of 0.921 g/12,000 g composition, the allantoin may be present in an amount of 0.8 g/12,000 g composition, the CV may be present in an amount of 0.0123 g/12,000 g composition, the ZnF may be present in an amount of 0.3 g/12,000 g composition, and the surfactant may be present in an amount of 49 g/12,000 g composition. The composition may further include water in an amount sufficient to yield 12,000 g of the total composition and/or to provide a composition having the concentrations of potassium hydroxide, potassium phosphate, potassium pyrophosphate, polyvinyl pyrrolidone, allantoin, CV, ZnF, and surfactant described here.

According to some embodiments of the present invention, the composition may comprise sodium hydroxide, sodium phosphate, polyvinyl pyrrolidone, allantoin, ZnF, zinc phosphate, and a surfactant (e.g., Carbowet® DC01 Surfactant from Air Products). The sodium hydroxide may be present in the composition in an amount of 19 g/12,000 composition, the sodium phosphate may be present in an amount of 74 g/12,000 g composition, the polyvinyl pyrrolidone may be present in an amount of 0.23 g/12,000 g composition, the allantoin may be present in an amount of 0.33 g/12,000 g composition, the ZnF may be present in an amount of 1 g/12,000 g composition, the zinc phosphate may be present in an amount of 0.8 g/12,000 g composition, and the surfactant may be present in an amount of 49 g/12,000 g composition. The composition may further include water in an amount sufficient to yield 12,000 g of the total composition and/or to provide a composition having the concentrations of sodium hydroxide, sodium phosphate, polyvinyl pyrrolidone, allantoin, ZnF, zinc phosphate, and surfactant described here.

According to some embodiments of the present invention, the composition may comprise sodium hydroxide, sodium phosphate, sodium pyrophosphate, zinc phosphate, AMTZ (2-amino-5-mercapto-1,3,4-thiadiazole), cystine, and a surfactant (e.g., Carbowet® DC01 Surfactant from Air Products). The sodium hydroxide may be present in the composition in an amount of 19 g/12,000 composition, the sodium phosphate may be present in an amount of 57.6 g/12,000 g composition, the sodium pyrophosphate may be present in an amount of 27.6 g/12,000 g composition, the zinc phosphate may be present in an amount of 0.8 g/12,000 g composition, the AMTZ may be present in an amount of 3 g/12,000 g composition, the cystine may be present in an amount of 3 g/12,000 g composition, and the surfactant may be present in an amount of 49 g/12,000 g composition. The composition may further include water in an amount sufficient to yield 12,000 g of the total composition and/or to provide a composition having the concentrations of sodium hydroxide, sodium phosphate, sodium pyrophosphate, zinc phosphate, AMTZ, cystine, and surfactant described here.

According to some embodiments of the present invention, the composition may comprise sodium hydroxide, sodium phosphate, sodium polyphosphate, zinc phosphate, cystine, and a surfactant (e.g., Carbowet® DC01 Surfactant from Air Products). The sodium hydroxide may be present in the composition in an amount of 19 g/12,000 composition, the sodium phosphate may be present in an amount of 57.6 g/12,000 g composition, the sodium pyrophosphate may be present in an amount of 27.6 g/12,000 g composition, the zinc phosphate may be present in an amount of 1.5 g/12,000 g composition, the cystine may be present in an amount of 1 g/12,000 g composition, and the surfactant may be present in an amount of 49 g/12,000 g composition. The composition may further include water in an amount sufficient to yield 12,000 g of the total composition and/or to provide a composition having the concentrations of sodium hydroxide, sodium phosphate, sodium pyrophosphate, zinc phosphate, cystine, and surfactant described here.

According to some embodiments of the present invention, the composition may comprise sodium hydroxide, sodium phosphate, Start Right® (a water conditioner available from United Pet Group, Inc., Madison, Wis.), and a surfactant (e.g., Carbowet® DC01 Surfactant from Air Products). In some embodiments, any suitable water conditioner may be used in place of the Start Right®. For example, a mixture of allantoin and polyvinylpyrrolidone may be used as the water conditioner, and in some embodiments, this mixture may include 0.33 g allantoin and 0.22 g polyvinylpyrrolidone per 12 L of composition. The sodium hydroxide may be present in the composition in an amount of 19 g/12,000 composition, the sodium phosphate may be present in an amount of 75 g/12,000 g composition, the water conditioner (e.g. Start Right®) may be present in an amount of 1.8 g/12,000 g composition, and the surfactant may be present in an amount of 49 g/12,000 g composition. The composition may further include water in an amount sufficient to yield 12,000 g of the total composition and/or to provide a composition having the concentrations of sodium hydroxide, sodium phosphate, water conditioner (e.g., Start Right®), and surfactant described here.

According to some embodiments of the present invention, the composition may comprise sodium hydroxide, sodium phosphate, polyvinyl pyrrolidone, allantoin, DMTZ, a first surfactant (e.g., Dynol 604), and a second surfactant (e.g., Carbowet® DC01 Surfactant from Air Products). The sodium hydroxide may be present in the composition in an amount of 19 g/12,000 composition, the sodium phosphate may be present in an amount of 75 g/12,000 g composition, the polyvinyl pyrrolidone may be present in an amount of 0.23 g/12,000 g composition, the allantoin may be present in an amount of 0.23 g/12,000 g composition, the DMT may be present in an amount of 12 g/12,000 g composition, the first surfactant may be present in an amount of 25 g/12,000 g composition, and the second surfactant may be present in an amount of 25 g/12,000 g composition. The composition may further include water in an amount sufficient to yield 12,000 g of the total composition and/or to provide a composition having the concentrations of sodium hydroxide, sodium phosphate, polyvinyl pyrrolidone, allantoin, DMTZ, and the first and second surfactants described here.

According to another embodiment of the invention, a metal substrate (e.g., an aluminum or aluminum alloy substrate) may comprise a surface that is contacted with a composition according to embodiments of the invention. Nonlimiting examples of suitable substrates include aluminum, zinc, iron, and/or magnesium substrates. Additional nonlimiting examples of suitable metal substrates include high copper containing aluminum alloys such as Aluminum 2024.

According to some embodiments, the metal substrate may be pre-treated prior to contacting the metal substrate with the compositions described above. As used herein, the term "pre-treating" refers to the surface modification of the substrate prior to subsequent processing. Such surface modification can include various operations, including, but not limited to cleaning (to remove impurities and/or dirt from the surface), deoxidizing, and/or application of a solution or coating, as is known in the art. Pre-treatment may have one or more benefits, such as the generation of a more uniform starting metal surface, improved adhesion to a subsequent coating on the pre-treated substrate, and/or modification of the starting surface in such a way as to facilitate the deposition of a subsequent composition.

According to some embodiments, the metal substrate may be prepared by first solvent treating the metal substrate prior to contacting the metal substrate with the composition. As used herein, the term "solvent treating" refers to rinsing, wiping, spraying, or immersing the substrate in a solvent that assists in the removal of inks, oils, etc. that may be on the metal surface. Alternately, the metal substrate may be prepared by degreasing the metal substrate using conventional degreasing methods prior to contacting the metal substrate with the composition.

The metal substrate may be pre-treated by solvent treating the metal substrate. Then, the metal substrate may be pre-treated by cleaning the metal substrate with an alkaline cleaner, such as a composition according to an embodiment of the present invention.

In some embodiments, the metal substrate may be pre-treated by mechanically deoxidizing the metal prior to applying the composition on the metal substrate. A nonlimiting example of a typical mechanical deoxidizer is uniform roughening of the surface using a Scotch-Brite pad, or similar device.

According to some embodiments, the metal substrate may be pre-treated by solvent wiping the metal prior to applying the composition to the metal substrate. Nonlimiting examples of suitable solvents include methyl ethyl ketone (MEK), methyl propyl ketone (MPK), acetone, and the like.

Additional optional procedures for preparing the metal substrate include the use of a surface brightener, such as an acid pickle or light acid etch, or a smut remover.

The metal substrate may be rinsed with either tap water, or distilled/de-ionized water between each of the pretreatment steps, and may be rinsed well with distilled/de-ionized water and/or alcohol after contact with the composition according to embodiments of the present invention. However, as noted above, according to some embodiments of the present invention, some of the above described pre-treatment procedures and rinses may not be necessary prior to or after application of the composition according to embodiments of the present invention.

Once the metal substrate has been appropriately pre-treated, if desired, the composition according to embodiments of the present invention may then be allowed to come in contact with at least a portion of the surface of the metal substrate. The metal substrate may be contacted with the composition using any conventional technique, such as dip immersion, spraying, or spreading using a brush, roller, or the like. With regard to application via spraying, conventional (automatic or manual) spray techniques and equipment used for air spraying may be used. In other embodiments, the composition may be applied using an electrolytic-coating system.

After contacting the metal substrate with the composition, the metal substrate may optionally be air dried. However, the substrate need not be dried, and in some embodiments, drying is omitted. A rinse is not required, but may be performed if desired.

According to some embodiments, the metal substrate may be first prepared by mechanical abrasion and then wet-wiped to remove smut. The substrate may then optionally be air-dried prior to application. However, the substrate need not be dried, and in some embodiments, drying is omitted. Next, the composition may be applied to the metal substrate and optionally allowed to dry, for example in the absence of heat greater than room temperature. However, drying is not required, and in some embodiments, drying is omitted. The substrate need not be rinsed, and the metal substrate may then be further coated with conversion coatings, primers and/or top coats to achieve a substrate with a finished coating.

When the composition is applied to the metal substrate by immersion, the immersion times may vary from a few seconds to multiple hours, for example less than 30 minutes or three minutes or less. When the composition is applied to the metal substrate using a spray application, the composition may be brought into contact with at least a portion of the substrate using conventional spray application methods. The dwell time in which the composition remains in contact with the metal substrate may vary from a few seconds to multiple hours, for example less than 30 minutes or three minutes or less.

The coating compositions may also be applied using other techniques known in the art, such as application via swabbing. Again, the dwell time in which the composition remains in contact with the metal substrate may vary from a few seconds to multiple hours, for example less than 30 minutes or three minutes or less.

After contacting the metal substrate with the composition, the metal substrate may optionally be air dried, and then rinsed with tap water, or distilled/de-ionized water. Alternately, after contacting the metal substrate with the composition, the metal substrate may be rinsed with tap water, or distilled/de-ionized water, and then subsequently air dried (if desired). However, the substrate need not be dried, and in some embodiments, drying is omitted. Additionally, as noted above, the substrate need not be rinsed, and the metal substrate may then be further coated with conversion coatings, primers and/or top coats to achieve a substrate with a finished coating. Accordingly, in some embodiments this subsequent rinse may be omitted.

In some embodiments, the composition according to embodiments of the invention may be applied to a metal substrate for 1 to 10 minutes (for example, 3 to 5 minutes), and the surface of the metal substrate may be kept wet by reapplying the composition. Then, the composition is optionally allowed to dry, for example in the absence of heat greater than room temperature, for 5 to 10 minutes (for example, 7 minutes) after the last application of the composition. However, the substrate does not need to be allowed to dry, and in some embodiments, drying is omitted. For example, according to some embodiments, a solvent (e.g., alcohol) may be used to rinse the substrate, which allows the omission of a drying step. After the drying step (if performed), the metal substrate may be further treated with a conversion coating, e.g., a rare earth conversion coating, such as a cerium or yttrium based conversion coating. Examples of such coatings include those having cerium and/or yttrium salts. In addition to rare earth coatings, any suitable conversion coating chemistry may be used, such as, for example, those that are capable of forming a precipitate upon a change in pH. Nonlimiting examples of such coating chemistries include trivalent chrome, such as Alodine 5900 (available from Henkel Technologies, Madison Heights, Mich.), zirconium, such as Alodine 5900 (available from Henkel Technologies, Madison Heights, Mich.), sol gel coatings, such as those sold under the name DesoGel™ (available from PRC-DeSoto International, Inc. of Sylmar, Calif.), cobalt coatings, vanadate coatings, molybdate coatings, permanganate coatings, and the like, as well as combinations, such as, but not limited to Y and Zr. The conversion coating (e.g., a rare earth conversion coating) may be applied to the metal substrate for 5 minutes. The substrate need not be rinsed, and the metal substrate may then be further coated with primers and/or top coats to achieve a substrate with a finished coating.

Whereas particular embodiments of the present disclosure have been described above for purposes of illustration, it will be understood by those of ordinary skill in the art that numerous variations of the details of the present disclosure may be made without departing from the invention as defined in the appended claims, and equivalents thereof. For example, although embodiments herein have been described in connection with "a" hydroxide or phosphate, and the like, one or more of these components or any of the other components recited can be used according to the present disclosure.

Although various embodiments of the present disclosure have been described in terms of "comprising" or "including," embodiments "consisting essentially of" or "consisting of" are also within the scope of the present disclosure. For example, while the present disclosure describes a composition including a corrosion inhibitor and a hydroxide and/or phosphate, a composition and/or a solution consisting essentially of or consisting of the corrosion inhibitor and a hydroxide and/or phosphate is also within the scope of the present disclosure. Similarly, although a corrosion inhibitor comprising or including a metal ion is described, corrosion inhibitors consisting essentially of or consisting of a metal ion are also within the scope of the disclosure. Thus, as described above, the composition may consist essentially of the corrosion inhibitor and a hydroxide and/or phosphate. In this context, "consisting essentially of" means that any additional components in the composition will not materially affect the corrosion resistance of a metal substrate including the composition or the alkaline pH of the composition. For example, a composition consisting essentially of a corrosion inhibitor and a hydroxide or phosphate is free from anions other than hydroxide and/or phosphate.

As used herein, unless otherwise expressly specified, all numbers such as those expressing values, ranges, amounts or percentages may be read as if prefaced by the word "about," even if the term does not expressly appear. Further, use of the word "about" reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure describes "a" metal complexing agent, a mixture of such metal complexing agents can be used. When ranges are given, any endpoints of those ranges and/or numbers within those ranges can be combined within the scope of the present disclosure. The terms "including" and like terms mean "including but not limited to." Similarly, as used herein, the terms "on," "applied on," and "formed on" mean on, applied on, or formed on, but not necessarily in contact with the surface. For example, a coating layer "formed on" a substrate does not preclude the presence of one or more other coating layers of the same or different composition located between the formed coating layer and the substrate.

Notwithstanding that the numerical ranges and parameters set forth herein may be approximations, numerical values set forth in the specific examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. A composition for application to a metal substrate, the composition comprising:
    an aqueous carrier;
    a hydroxide anion;
    a phosphate anion;
    an azole compound comprising a pyrrole, a pyrazole, an imidazole, a triazole, a tetrazole, a pentazole, an oxazole, an isoxazole, a thiazole and/or an isothiazole;
    polyvinyl pyrrolidone; and
    allantoin.

2. The composition according to claim 1, further comprising a surfactant, a chelator, a thickener, a silane and/or an alcohol.

3. The composition according to claim 1, wherein any chrome present in the composition is present as an incidental impurity.

4. An article, comprising:
    a substrate; and
    the composition of claim 1 on at least a portion of the substrate.

5. The article of claim 1, further comprising a coating on the composition.

6. A composition for application to a metal substrate, the composition comprising:
   an aqueous carrier;
   a hydroxide anion;
   a phosphate anion;
   an azole compound comprising a cyclic compound having 1 nitrogen atom, a cyclic compound having 2 or more nitrogen atoms, a cyclic compound having 1 nitrogen atom and 1 oxygen atom, and/or a cyclic compound having 1 nitrogen atom and 1 sulfur atom;
   polyvinyl pyrrolidone; and
   allantoin.

7. The composition according to claim 6, further comprising a surfactant, a chelator, a thickener, a silane and/or an alcohol.

8. The composition according to claim 6, wherein any chrome present in the composition is present as an incidental impurity.

9. An article, comprising:
   a substrate; and
   the composition of claim 6 on at least a portion of the substrate.

10. The article of claim 9, further comprising a coating on the composition.

11. A composition for application to a metal substrate, the composition comprising:
    an aqueous carrier;
    a hydroxide anion;
    a phosphate anion;
    an azole compound;
    polyvinyl pyrrolidone; and
    allantoin;
    wherein any chrome present in the composition is present as an incidental impurity.

12. The composition according to claim 11, further comprising a surfactant, a chelator, a thickener, a silane and/or an alcohol.

13. An article, comprising:
    a substrate; and
    the composition of claim 11 on at least a portion of the substrate.

14. The article of claim 13, further comprising a coating on the composition.

* * * * *